United States Patent [19]

Falk

[11] Patent Number: 4,473,119

[45] Date of Patent: Sep. 25, 1984

[54] PROCESS FOR SELECTIVELY PLUGGING SUBTERRANEAN FORMATIONS WITH A MELAMINE RESIN

[75] Inventor: David O. Falk, Denver, Colo.

[73] Assignee: Marathon Oil Company, Findlay, Ohio

[21] Appl. No.: 484,758

[22] Filed: Apr. 14, 1983

[51] Int. Cl.$^3$ .......................................... E21B 33/138
[52] U.S. Cl. ..................................... 166/295; 166/300
[58] Field of Search ............... 166/270, 281, 294, 295, 166/300

[56] References Cited

U.S. PATENT DOCUMENTS

| | | | |
|---|---|---|---|
| 2,562,866 | 7/1951 | Kurtz, Jr. et al. | 166/295 X |
| 2,649,159 | 8/1953 | Boyer | 166/295 |
| 3,306,356 | 2/1967 | Sparlin | 166/295 |
| 3,495,412 | 2/1970 | Sakata et al. | 61/36 |
| 3,956,140 | 5/1976 | Nahm et al. | 252/8.5 |
| 4,157,322 | 6/1979 | Colegrove | 166/300 X |
| 4,210,206 | 7/1980 | Ely et al. | 166/294 |

FOREIGN PATENT DOCUMENTS 722760  11/1965  Canada ................................ 166/295

Primary Examiner—George A. Suchfield
Attorney, Agent, or Firm—Jack L. Hummel; Rodney F. Brown

[57] ABSTRACT

Highly permeable zones in a subterranean formation are selectively plugged by injecting a melamine formaldehyde solution via a well into the highly permeable zones. The solution is water soluble and preferentially enters water-containing zones where it reacts to form a resin at a temperature of from about 25° C. to about 120° C. and a pH of from about 7 to 12 and over a period of from about 1 to 4 days. The resulting resin substantially plugs the highly permeable zones in the formation.

12 Claims, No Drawings

PROCESS FOR SELECTIVELY PLUGGING SUBTERRANEAN FORMATIONS WITH A MELAMINE RESIN

DESCRIPTION

1. Technical Field

The invention relates to a process for selectively plugging highly permeable zones in a subterranean formation with a melamine resin.

2. Background Art

Fluids preferentially migrate into highly permeable zones in subterranean formations. This migration is undesirable when injecting treatment fluids into hydrocarbon-bearing formations for post-primary recovery of residual hydrocarbons. The treatment fluids channel through the highly permeable zones bypassing the less permeable zones. The result is poor conformance and flow profiles of the treatment fluid in the formation. The hydrocarbons residing in the less permeable zones are not produced and the overall yield of hydrocarbons from the formation is reduced.

Highly permeable zones in subterranean formations are plugged to prevent migration of treatment fluids into them and to divert treatment fluids into adjacent, less permeable zones. One plugging method is to inject fluids into the formation prior to treatment fluids. The injected plugging fluids preferentially enter and plug the highly permeable zones. Subsequently injected fluids are diverted into less permeable zones, facilitating recovery of hydrocarbons therein. U.S. Pat. No. 3,956,140 to Nahm et al teaches the addition of water soluble condensation products to drilling fluids to improve the fluid loss characteristics of the drilling fluid. The condensation products are generated by reacting phenol, formaldehyde and sulfite salts. The condensation products may be modified by adding nitrogencontaining compounds such as melamine and urea. U.S. Pat. No. 3,495,412 to Sakata et al teaches an in situ process for reducing the permeability of soil. A three-component aqueous solution comprising urea, formaldehyde and polyvinyl alcohol is injected into the soil where it is cured with an acidic substance to form a resin plug. U.S. Pat. No. 4,210,206 to Ely et al teaches a high temperature well treating process. High molecular weight polyacrylamides are cross-linked with water soluble melamine formaldehyde resins in situ to form a thermally stable gel which temporarily blocks the formation.

A process is needed whereby an injected water soluble fluid penetrates the water-containing highly permeable zones of a hydrocarbon-bearing formation to form a rigid, water insoluble plug of the zones. A process is further needed whereby the strength and permanence of the plug is enhanced as the temperature of the formation water increases.

DISCLOSURE OF INVENTION

The present invention provides a process for selectively plugging highly permeable zones in a subterranean formation with a melamine resin. A solution of melamine and formaldehyde in a water soluble solvent is injected into an alkaline formation environment. The solution preferentially migrates into the highly permeable zones of the formation which contain substantial amounts of water. The solution reacts in situ at the formation temperature to produce a nonflowing, water insoluble resin. The resin permanently plugs the highly permeable zones.

BEST MODE FOR CARRYING OUT THE INVENTION

The present invention relates to a process for selectively plugging highly permeable zones in a subterranean formation with a nonflowing, water insoluble resin. The process comprises dissolving melamine and formaldehyde in a water soluble solvent. The resulting solution is injected into the zones where it reacts under alkaline conditions to form a non-flowing, water insoluble resin. The resin remains rigidly and permanently in place under the elevated thermal conditions of the hydrocarbon-bearing formation.

A resin is an amorphous, water insoluble solid. The resin components are linked by chemical bonds in a dense but random network to form a single large molecular mass.

The water soluble reaction solution is prepared by first adding a concentrated formaldehyde solution to a water soluble solvent at ambient atmospheric temperature, about 20° C. The solvent can be aqueous such as brine or fresh water or it can be an alcohol. The alcohols containing up to 5 carbon atoms are water soluble such as methanol, ethanol, propanol, ethylene glycol, etc. The pH of the resulting solution is adjusted to from about 7 to about 12 and preferably about 8 to about 9 by the addition of a base. Examples of bases include basic organic compounds, basic inorganic hydroxide compounds or basic buffer compounds, such as sodium hydroxide, inorganic and quaternary ammonium hydroxides, sodium phosphate buffer, etc.

Solid melamine is added to the reaction solution. About 15 to 18 hours is required to solubilize the melamine in the reaction solution by continuous mixing at atmospheric temperature and neutral pH. Dissolution of the melamine can be accelerated by increasing the temperature and/or increasing the pH of the reaction solution. However, the melamine is preferably dissolved at atmospheric temperature to prevent premature resin formation.

In an alternate embodiment the melamine is slurried with the solution of formaldehyde and water. The slurry is immediately injected into the formation. As the slurry reaches the temperature of the formation water the melamine goes into solution and resin formation occurs. When treating extensively fractured formations, the slurried solid melamine coats the fracture faces upon injection. Resin formation is restricted in this manner to large fractured areas near the well bore.

In either case the initial concentrations of reactants in the water soluble solvent are such that the moles of formaldehyde exceed the moles of melamine. It is preferred that the molar ratio of formaldehyde to melamine initially present in the reaction solution is at least about 2:1. The weight percent concentration range of melamine initially present in the reaction solution is from about 0.5% to about 10% and preferably about 1% to about 2%. The most preferred concentration is about 2%. The concentration of formaldehyde is from about 0.5% to about 10% and preferably about 1% to about 2%. The most preferred concentration is about 2%.

Where melamine is dissolved in the formaldehyde water solution at the well head, it may be necessary to readjust the pH of the reaction solution to about 7 to about 12 and preferably about 8 to about 9 by additional base immediately prior to injection. About 20 to 100 barrels of the completed reaction solution are then injected into the highly permeable zones via a well at a rate of about 100 to about 400 barrels per day. The preference of the reactants to enter the highly permeable zones can be further ensured by the use of packers.

The temperature of the formation water must be within a range of from about 25° C. to about 120° C. and preferably about 80° C. to about 110° C. for the resin reaction to proceed. The reaction temperature can be regulated in situ to a certain degree by injecting fluid at predesigned temperatures. Where the temperature of the formation water is low, near 25° C., it may be necessary to drive the reaction by increasing the initial reaction pH and/or the concentration of formaldehyde.

The reaction goes to completion in an alkaline environment. However, reducing the pH of the reaction after initiation to as low as about 5 increases the rate of resin formation. The pH is reduced by injecting an acid such as hydrochloric acid into the highly permeable zones. An elapsed reaction time of at least about 12 hours is required before the pH of the reaction is reduced. Elapsed reaction time begins from the time the reaction solution reaches the reaction temperature, i.e. the formation water temperature.

The reaction time is a function of the reaction temperature, pH and concentration of the reactants. The reaction time is determined by fixing the parameters listed above within their respective range of values such that reaction time is from about 1 to about 4 days and preferably about 1 to about 2 days. The viscosity of the reaction solution increases as the reaction progresses. Upon completion of the reaction, the reaction solution sets to a permanent, clear, rigid, water insoluble resin in the highly permeable zones. If a packer has been used, it is removed from the well bore. Post-primary treatments such as water, polymer, micellar/polymer, etc. are injected into the formation to enhance recovery of hydrocarbons therefrom.

The resin is believed to be a condensation product of methylolated melamine intermediates which are bonded by methylene and ether bonds. Methylolation of the melamine is the initiation step for resin formation. The melamine is relatively insoluble in water at room temperature and a neutral pH. However, in an alkaline environment the melamine is methylolated in the presence of formaldehyde at the amine sites of the melamine to produce either the stable intermediate hexamethylolmelamine or the less stable intermediate trimethylolmelamine. The resulting intermediates are water soluble. The relative proportion of intermediates produced is dependent on the formaldehyde concentration. A high formaldehyde concentration favors increased methylolation resulting in a high proportion of hexamethylolmelamine while a low formaldehyde concentration is less favorable to methylolation and results in a high proportion of trimethylolmelamine in the reaction mixture.

The second step of the resin formation reaction is condensation. Hexamethylolmelamine is highly reactive at the six methylolated sites. The methylolated branches react with other hexamethylolmelamines to form ether bonds by the condensation of water. Trimethylolmelamine contains only three methylolated reaction sites for resin bonding. The methylolated branches react with unmethylolated amines, bonding trimethylolmelamines together in methylene bonds and releasing water as a condensation product. The resin results from the network of methylene and ether bonds.

The character of the resin can be modified by the addition of other amide-containing compounds to the reaction solution such as polyacrylamide, urea, thiourea, etc. and/or phenols, which react with formaldehyde.

The present process is not to be limited by the particular mechanism described herein. The possible structures of the polymer resin are provided above to illustrate certain types of structures that can occur within the produced resin. By practicing the process of the invention other resin structures can be produced, which are within the scope of this invention.

The following examples are illustrative of the present invention and are not to be construed as limiting the scope therefore.

EXAMPLE 1

One hundred barrels of a 2% formaldehyde solution is prepared by diluting a 37% concentrated formaldehyde solution with fresh water. 320 kilograms of solid melamine is mixed with the formaldehyde solution. The pH of the resulting mixture is adjusted to 9 by the addition of sodium hydroxide. The melamine dissolves in the formaldehyde solution after 15 hours resulting in an aqueous solution containing 2% formaldehyde and 2% melamine. The pH of the solution is readjusted to 9 by the addition of sodium hydroxide. The entire 100 barrels of the solution is then injected into the formation via a well at a rate of 400 barrels per day. The fluid preferentially enters the highly permeable zones of the formation. The formation water has a temperature of 90° C. and a pH of 7. Two days after injection the injected fluid sets in the highly permeable zones to a non-flowing, water insoluble resin. The resin substantially prevents migration of fluids into the highly permeable zones.

EXAMPLE 2

The formaldehyde melamine solution of Example 1 is injected into the formation via a well under the same conditions as Example 1. Twelve hours later an acid is injected into the formation until the pH of the formation water reaches 5. Two days after injection the injected fluid sets in the highly permeable zones to a non-flowing, water insoluble resin. The resin substantially prevents migration of fluids into the highly permeable zones.

EXAMPLE 3

One hundred barrels of a 2% formaldehyde solution is prepared by diluting a concentrated formaldehyde solution with fresh water. 320 kilograms of solid melamine is slurried in the formaldehyde solution. The pH of the resulting slurry is adjusted to 9 by the addition of sodium hydroxide to the slurry. One hundred barrels of the slurry is immediately injected into a highly fractured formation via a well at a rate of 400 barrels per day. The formation water has a temperature of 90° C. and a pH of 7. Three days after injection the injected slurry sets in the highly fractured zones of the formation to a non-flowing, water insoluble resin. The resin substantially prevents migration of fluids into the fractured zones.

While the foregoing preferred embodiment of the invention has been described and shown, it is understood that the alternatives and modifications, such as those suggested, and others may be thereto, and fall within the scope of the invention.

What is claimed:

1. A process for selectively plugging highly permeable zones of a subterranean formation comprising the steps of:
    (a) dissolving melamine and formaldehyde in a water soluble solvent wherein the molar ratio of formaldehyde to melamine is at least about 2:1 in said solvent;
    (b) injecting said melamine, formaldehyde and solvent into said highly permeable zones via a well in fluid communication with said zones; and
    (c) reacting said melamine and formaldehyde in situ at a temperature of from about 25° C. to about 120° C. and at a pH of from about 7 to about 12 for a time of from about 1 to about 4 days to produce a resin which substantially plugs said highly permeable zones.

2. The process of claim 1 wherein the molar ratio of formaldehyde to melamine is at least about 4:1 in said solvent.

3. The process of claim 2 wherein the concentration of said melamine is from about 0.5% to about 10% by weight and said formaldehyde is from about 0.5% to about 10% by weight in said solvent.

4. The process of claim 3 wherein the concentration of said melamine is from about 1% to about 2% by weight and said formaldehyde is from about 1% to about 2% by weight in said solvent.

5. The process of claim 1 wherein said solvent is water.

6. The process of claim 1 wherein said solvent is an alcohol containing less than about 6 carbon atoms.

7. The process of claim 1 wherein the pH of said solution is adjusted from about 7 to about 12 prior to injecting said solution by adding a base to said solution.

8. The process of claim 1 wherein the pH of water within said formation is adjusted to from about 7 to about 5 after the reaction of step (c) is initiated by injecting an acid into said formation.

9. The process of claim 8 wherein said acid is injected into said formation from about 12 to about 24 hours after said melamine and formaldehyde reach the temperature of said formation.

10. The process of claim 1 wherein said melamine and formaldehyde are reacted at a temperature of from about 80° C. to about 110° C.

11. The process of claim 1 wherein said melamine and formaldehyde are reacted for a time of from about 1 to about 2 days.

12. The process of claim 1 wherein said melamine and formaldehyde are reacted at a pH of from about 8 to about 9.

* * * * *